Patented Aug. 9, 1938

2,125,880

UNITED STATES PATENT OFFICE 2,125,880

MANUFACTURE OF MIXED ALIPHATO-NITRO CELLULOSE AND PRODUCTS THEREOF

Ernst Berl, Pittsburgh, Pa.

No Drawing. Application July 3, 1936, Serial No. 88,900. In Great Britain April 12, 1935

6 Claims. (Cl. 260—101)

The present invention relates to the manufacture of mixed cellulose esters and, more particularly, to the manufacture of mixed inorganic and organic esters of cellulose and other carbohydrates and the production of fatty acid esters thereof.

It is an object of the present invention to produce mixed esters having novel properties.

It is another object of the present invention to produce mixed esters in which practically all three hydroxyl groups are substituted by nitric acid and organic acids.

It is a further object of the invention to convert esters into lower substituted mixed esters which, according to the degree of substitution, are soluble in acetone, acetone-alcohol or aqueous acetone.

The invention also contemplates providing a method for the production of mixed esters in which only a smaller amount of the three hydroxyl groups that can be substituted is actually substituted.

Other objects and advantages of the invention will be apparent from the following description.

Broadly stated, the invention provides the introduction of varying amounts of nitric acid and organic acids, especially those containing a small number of carbon atoms, such as, formic, acetic, proponic, and butyric, etc., into the carbohydrate molecule. These organic acids may be of the saturated or unsaturated series.

When practically all three hydroxyl groups are substituted by nitric acid and organic acids, the ratio of the quantity of substituted nitric acid to the quantity of substitued organic acid has a bearing on the properties of the resultant mixed esters. For example, when the ratio of nitric acid to organic acid is rather high, these esters are soluble in acetone and its homologues. When the number of nitric acid groups introduced into the molecule of carbohydrate is rather low compared to the number of organic acid groups introduced into the molecule, the mixed esters so produced are insoluble in acetone, but soluble in chlorinated hydrocarbons like methylene chloride, chloroform and acetylene tetrachloride. These highly substituted mixed esters can be produced without destroying the fibre or the crystalline structure or they can be produced by destroying the original physical structure of the carbohydrate. Furthermore, one or less than one hydroxyl group may be substituted in each $C_6$ molecule of carbohydrate to obtain a low substituted mixed ester insoluble in all organic solvents, but, depending on the degree of substitution, swelling more or less in these solvents.

It is also possible to convert these tri-esters into lower substituted mixed esters by re-saponification. The resulting lower substituted mixed esters are soluble in acetone, acetone-alcohol or aqueous acetone depending upon the degree of substitution. The re-saponification may be carried out with or without destroying the fibre structure of the carbohydrate.

The properties of these mixed esters differ with the degree of total substitution as well as with the type of substitution. Those esters with only a small porion of the hydroxyl groups substituted which at the same time contain little combined nitric acid show great resistance to the action of dilute acids and to high temperatures in the presence or absence of oxygen. Due to their insolubility in all organic solvents, these novel esters show certain advantages compared with the soluble esters. These esters cannot be dyed with the conventional cotton dyestuffs. It is possible to get special effects in dyeing the novel esters together with cotton or cellulose rayon.

The completely substituted tri-esters are remarkable because of their resistance to degradation. Materials which may be formed from these tri-esters show a great tensile strength and high elongation. The mixed tri-esters can be produced in a variety of forms by the use of suitable solvents. For example, films, foils, tubes, threads, and ribbons can be fabricated from these tri-esters. These materials show an especially high resistance to water. According to the proportions of the combined nitric acid and combined organic acids, the properties may be varied practically at will.

The mixed esters which can be produced by the saponification of a tri-ester exhibit outstanding properties. They are soluble in acetone and, when they contain large amounts of combined nitric acid, they are soluble in mixtures of ether-alcohol and in solvents which contain alcohol and ether groups at the same time. The tensile strength and elongation of materials made from these partly saponified esters are excellent.

By denitration of these mixed carbohydrate esters containing nitric acid and lower fatty acids, new esters of carbohydrates with lower fatty acids are obtained which do not contain any substantial amount of nitrogen or when the denitration has not been carried far enough, with rather low nitrogen content. These esters with little or practically no nitrogen also show distinguishing qualities. To produce shapes or forms of any kind, the mixed esters are dissolved in solvents and formed to the desired patterns. After denitrifying more or less completely in accordance with the properties desired, the materials are obtained more or less free of combined nitrogen. In addition they contain so little combined fatty acid that they are no longer soluble in any organic solvent. The denitration may be carried out in any well-known manner, either in heterogeneous or homogeneous medium, under mild conditions so that the saponification of the fatty ester does not take place to any extent. This process makes possible the production of substantially any practical shape because the nitrated materials are soluble in solvents and can be formed using, preferably mixed esters with rather high nitrogen content, which are then denitrated.

The process described in Example No. 1 permits the conversion of substantially any fibre or structure into insoluble mixed esters.

*Example No. 1.*—Cellulose is treated at normal or somewhat elevated temperature with an excess of a mixture of strong nitric acid and glacial acetic acid containing from about 20 to 30% of nitric acid. After a treatment, usually of several hours, the excess of the used acid mixture is substantially eliminated. This acid mixture can be restored to its original strength by the addition of strong nitric acid or anhydride of nitric acid or of acetic acid anhydride or by the addition of mixtures of these acid substances. The acid mixture which adheres to the fibres may be eliminated by washing with glacial acetic acid. This glacial acetic acid can be removed with a suitable liquid like benzene, as is well-known in the art.

Acetic anhydride is then added to the washed fibres with or without the addition of a diluting agent like benzene. As a catalyst, sulfuric acid, perchloric acid, or any other catalyst may be added to the acetic anhydride in the amount of from about 0.1 to about 1.0% calculated on the weight of the cellulose. Alternatively, the catalyst may be added in equivalent quantity to the glacial acetic acid which is used to remove the first acid mixture. Preferably, the partly nitrated material is treated first at a low temperature of about 0° C., then at room temperature and at an elevated temperature, but not higher than about 80° C. until the desired amount of acetic acid, for instance, from about 10 to about 25% of it has combined with the cellulose. After completion of the reaction, the acid mixture is substantially removed and the material is treated with benzol or any other suitable solvent and finally with water as is well known in the art. After a short stabilization, for instance, by boiling with 1% sodium sulfate or by heating with mono-, di-, or tri-valent alcohols, like ethanol, glycol, glycerine, etc. a material is obtained which has not changed its original physical structure. It may contain from about two to about five percent combined nitric acid and from about 10 to about 25% combined acetic acid. This material shows unusual characteristics with respect to the absorption of dyestuffs, stability to heat, and resistance to attack by dilute organic and inorganic acids.

*Example No. 2.*—Anhydrous cellulose or cellulose containing only a small quantity of moisture, such as for example, linters, pulp, bagasse cellulose, or cellulose of other origins is introduced into a suitable larger quantity of a mixture consisting of concentrated or anhydrous acetic acid (97–100%) and concentrated nitric acid (94–100%). The mixture contains approximately 33–45%) of nitric acid monohydrate. It is also possible to introduce nitric acid residues into the cellulose molecule by employing more dilute acetic acid and more concentrated nitric acid or by the use of glacial acetic acid and more dilute nitric acid. The process, however, requires a somewhat longer time and, because of the water content of the acid mixture, entails a greater degradation of the cellulose which is shown by the fibres breaking up. If desired or required small quantities of sulfuric acid and/or phosphoric acid (up to about 5% by weight) may be added to the acid mixture. The cellulose material is introduced into from about 20 to about 120 times its weight of the acid mixture or the acid mixture is caused to react with the quiescent cellulosic material at normal temperatures or slightly above or below normal. This can be done with advantage in any apparatus known to those skilled in the art constructed of pure aluminum or other suitable material. After a comparatively short time (from about 1 to about 7 hours), the waste acid mixture is removed. The acid mixture can be brought to its original strength or composition by the addition of acid as described in Example No. 1 and can be used again. The acid mixture still adhering to the fibre is washed out by means of strong acetic acid. Benzene, if desired or required, cooled to about its freezing point can be employed for the same purpose. The cellulosic material will have taken up only small quantities of nitrogen from a few tenths of 1% to about 8%. By increasing the proportion of nitric acid to acetic acid, more nitric acid radicles may be introduced into the cellulose molecule with advantage for many purposes. By employing about 90% of approximately anhydrous nitric acid (98.5%) and about 10% of glacial acetic acid (99.8%), up to about 13.4% of nitrogen can be introduced into the cellulose molecule. The cellulose product exists in a very reactive state. After completion of the washing, about 4 to about 8 parts by weight (preferably about 5 parts by weight) of acetic acid anhydride, calculated on 1 part by weight of the cellulosic material originally employed, and about 6 to about 12 parts by weight (preferably about 8 parts by weight) of benzene together with the adhering wash benzene are added to the cellulose product. If no catalyst has been added to the first bath, it may be advantageous to do so in the second bath. Small amounts as described in Example No. 1 are sufficient. At first the acetylation mixture is advantageously maintained at a low temperature (of about 0 to about 4° C.) and in the course of the acetylation during about 3 to about 15 hours brought to about 25 to about 30° C. and during about 1 to about 2 hours to 70 to 80° C. The acetylation can be accomplished by agitating or rotating or stirring or pumping the acetylating mixture through the fibrous material. On account of the high reactivity of the weakly nitrated cellulose material which is due to the introduction of the nitric acid radicles, a complete substitution of the replaceable hydroxyl groups is attained in a comparatively short time. The cause of the increased reactivity is probably due to a strong swelling of the nitrated cellulose material in acetic acid. The acetylating mixture employed is washed out of the fibrous material which remains undissolved, suitably by means of benzene and/or other substances which cause the cellulose aceto-nitrate to swell but which do not dissolve the same, such as, for example, mono- or polyvalent alcohols or the corresponding diluted ketones, such as acetone, methylethyl-ketone and the like. The above organic displacing liquids are removed by systematic displacement by means of at first cold and then hot water.

The stabilization of the resulting cellulose aceto-nitrate can be effected according to Example No. 1.

The resulting products are distinguished by complete solubility in pure chloroform and pure methylene chloride. The small content of combined nitric acid does not render the products more inflammable than normal nitrogen free cellulose triacetate. The aceto-nitrates possessing a higher content of combined nitric acid are directly soluble in acetone. It is therefore unnecessary to resort to partial saponification for the purpose of rendering the products soluble in acetone as this is described hereinafter in Example No. 3.

*Example No. 3.*—Aceto-nitrates of cellulose are produced according to Example No. 2. The products poorer in nitric acid, which are insoluble in acetone, can be converted into acetone-soluble cellulose aliphato or aceto-nitrates by dissolving the fibrous material (after separation from the acetylating mixture) in strong formic acid or acetic acid or homologues thereof and, if desired or required, treated at elevated temperatures (40 to 70° C.) with the addition of substances possessing a saponifying action such as sulphuric acid, phosphoric acid, perchloric acid, the latter, if desired or required, with the addition of acids containing oxygen, such as phosphoric acid, chromic acid, boric acid and the like or by treatment with concentrated aliphatic acids at an increased temperature (for example, 80 to 120° C.) without the addition of an accelerating substance until a precipitated and dried test portion is shown to be soluble in acetone. Furthermore, one can add to the organic acid an alkali salt thereof, which destroys the effect of traces of inorganic catalyzer acid and which allows to carry out the reaction at the higher temperature with less degradation. Moreover, the saponification of the aliphato or aceto-nitrate with the maintenance of the fibrous structure can be carried out by introducing completely esterified material into a substance possessing a swelling but not a solvent action, such as mono- or polyvalent alcohols and/or ketones like acetone, for example, which are soluble in water or, for example, in benzene, and the saponification accomplished with or without the addition of the above mentioned catalysts, such as sulphuric acid, nitric acid, phosphoric acid, perchloric acid, the latter with or without the corresponding additions. In this manner, acetonitrates or aceto-formate-nitrates possessing a small content of nitrogen are obtained which readily dissolve in acetone. The small nitrogen content of all the mixed esters of cellulose with nitric acid and fatty acids described above probably explains the fact that the products obtained possess very desirable properties in respect of strength, extensibility and water resistivity as shown by the structures produced therefrom, such as threads, foils and films.

It is to be observed that the present invention provides a process for preparing denitrated and partially denitrated aliphatic esters of carbohydrate material with new and distinct properties. The mixed esters produced as described hereinabove are denitrated to a greater or lesser extent, as desired, in any well-known manner either in heterogenous or homogeneous medium under mild conditions so that saponification of the fatty ester does not take place to any substantial extent. These substantially or partially denitrated mixed esters may also be produced by nitrating carbohydrate material (cellulose) in any known manner, esterifying the nitrated material to produce aliphato-nitrates of the carbohydrate material and subsequently substantially or partially denitrating the aliphato-nitrate ester of the carbohydrate material. The completely or almost completely denitrated products of this process are substantially soluble in acetone. When denitration is only partial, the new article of manufacture is not only substantially soluble in acetone and its homologues but is soluble in mixtures of ether and alcohol and solvents containing both alcohol and ether groups.

I claim:—

1. The method of producing acetone-soluble mixed esters of cellulose which comprises reacting cellulose and a mixture of a catalyst, acetic acid and nitric acid containing very little water, washing said treated material to remove spent acid, treating said washed material with acetic anhydride containing a non-solvent swelling agent in the presence of a catalyst, removing excess acid, heating said acetone-insoluble acetylated material in the presence of a catalyst in at least one of the fatty acids having not more than 5 carbon atoms until a test piece shows complete solubility in acetone and stabilizing said mixed esters of cellulose containing nitrogen and acyl radicles of at least one of the lower fatty acids having not more than 5 carbon atoms whereby fatty acid nitrates of cellulose are produced.

2. The method of producing acetone-soluble mixed esters of cellulose which comprises reacting cellulose and a mixture of a catalyst, acetic acid and nitric acid containing very little water to obtain a cellulose product containing from about 2% to about 13% nitrogen without substanial destruction of the fiber, removing spent acid with a non-solvent swelling agent, treating said nitrated cellulosic material substantially free of spent acid with a mixture of acetic anhydride, benzene and a catalyst, removing waste acid, stabilizing said treated cellulosic material to obtain acetone-insoluble cellulosic material, dissolving said acetone-insoluble cellulosic material in a lower fatty acid having not more than five carbon atoms in the presence of a catalyst, heating until a test portion shows substantially complete solubility in acetone and stabilizing said acetone-soluble cellulosic material whereby fatty acid nitrates of cellulose are produced.

3. The method of producing acetone-soluble mixed esters of cellulose which comprises reacting cellulosic material and a mixture containing acetic acid and nitric acid and a catalyst wherein the nitric acid content is about 33 to about 45%, removing spent acid, suspending said nitrated cellulosic material substantially free of spent acid in a mixture of about 4 to about 8 parts by weight of acetic anhydride and about 6 to about 12 parts by weight of benzene per one part of original cellulosic material by weight, heating to about 70 to about 80° C. in about 4 to about 17 hours to acetylate said nitrate material, removing waste acid, stabilizing said acetylated material, dissolving said stabilized acetylated material in a lower fatty acid having not more than 5 carbon atoms in the presence of a catalyst, heating to about 40 to about 70° C. until a test portion shows substantially complete solubility in acetone and stabilizing said fatty acid nitrate of cellulosic material whereby fatty acid nitrates of cellulosic material soluble in acetone are produced.

4. The method of producing acetone-soluble mixed esters of cellulose which comprises reacting cellulosic material and a mixture containing a catalyst, acetic acid and nitric acid wherein the nitric acid content is about 33 to about 45%, removing spent acid, suspending said nitrated cellulosic material substantially free of spent acid in a mixture of about 5 parts by weight of acetic anhydride and about 8 parts by weight of benzene per one part by weight of original cellulosic material, heating said nitrated cellulosic material to about 70 to about 80° C. in the presence of a catalyst to acetylate said nitrated cellulosic material, stabilizing said acetylated cellulose nitrates, dissolving said stabilized acetylated cellulose nitrates in a lower fatty acid having not more than about 5 carbon atoms, heating to about 80 to about 120° C. until a test portion shows complete solubility in acetone and stabilizing said acetone soluble cellulosic material whereby fatty acid nitrates of cellulosic material completely soluble in acetone are produced.

5. The method of producing acetone-soluble mixed esters of cellulose which comprises reacting cellulosic material and a mixture containing about 90% nitric acid (98.5%) and 10% acetic acid (99.8%) to form a nitrated cellulose, removing spent acid, suspending said nitrated cellulosic material in a mixture of acetic anhydride and a non-solvent swelling agent, heating to about 70 to about 80° C. in the presence of a catalyst to form acetone-insoluble aceto-nitrates of cellulose, stabilizing said acetone-insoluble cellulose esters, dissolving said stabilized esters in a lower fatty acid having not more than 5 carbon atoms in the presence of an alkali salt of said lower fatty acid, heating said stabilized esters in said fatty acid to a temperature of about 80 to about 120° C. until a test portion shows complete solubility in acetone, removing excess fatty acid and stabilizing said acetone-soluble cellulosic material whereby fatty acid nitrates of cellulosic material soluble in acetone are produced.

6. The method of producing acetone-soluble mixed esters of cellulose which comprises forming cellulose nitrates, acetylating said cellulose nitrates with acetic anhydride in the presence of an inorganic acid catalyst, stabilizing said acetylated nitrated cellulosic material, dissolving said aceto-nitrates in a lower fatty acid having not more than 5 carbon atoms in the presence of a catalyst, heating until a test portion shows complete solubility in acetone and stabilizing said acetone-soluble material with liquid alcohols selected from the group consisting of ethanol, methanol and their homologues, benzyl alcohol, glycol and glycerine whereby fatty acid nitrates of cellulose soluble in acetone are produced.

ERNST BERL.